United States Patent Office 3,298,390
Patented Jan. 17, 1967

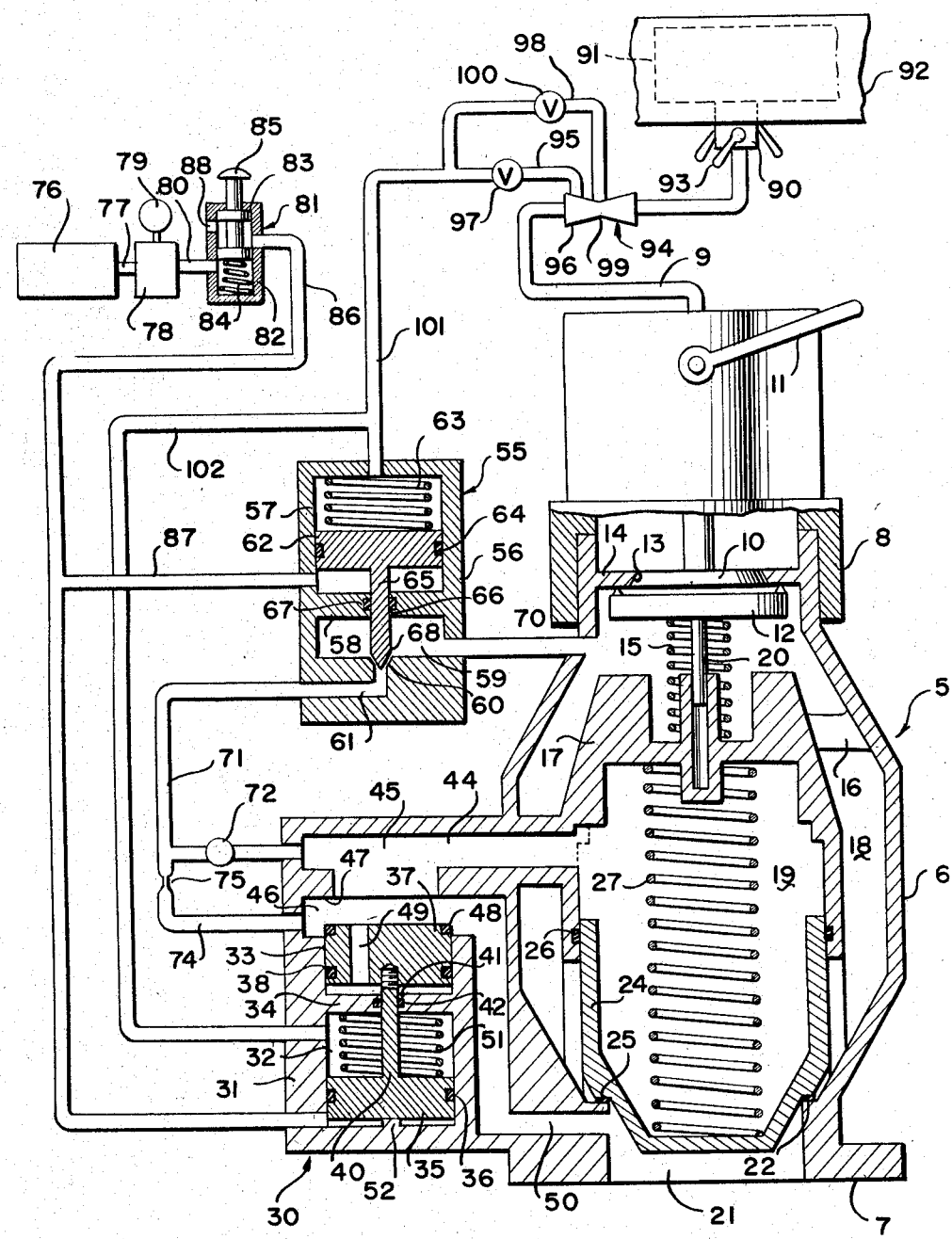

3,298,390
HYDRANT VALVE UNIT
Paul A. de Graaf, Los Angeles, Calif., assignor to Parker Hannifin Corporation, Cleveland, Ohio, a corporation of Ohio
Filed Apr. 16, 1965, Ser. No. 448,635
16 Claims. (Cl. 137—459)

This invention relates to pilot operated pressure regulating valves and more particularly to such a valve in which a single main valve is controlled by a pair of pilot valves, one of the pilot valves acting to regulate opening and closing of the main valve during normal operating conditions and the other pilot valve causing rapid closure of the main valve under abnormal operating conditions.

It is an object of the invention to provide a pressure regulating main valve controlled by a small capacity pilot valve and a large capacity pilot valve, the large capacity pilot valve being spring pressed toward an open position and movable toward its closed position by pressure of control fluid whereby release of pressure on the control fluid will cause opening of the large capacity pilot valve and rapid closing of the main valve.

It is another object to provide a pressure regulating main valve controlled by a small capacity pilot valve and a large capacity pilot valve and in which pressure of fluid discharged through the main valve, in the discharge conduit, urges the small capacity pilot valve toward closed position and the large capacity pilot valve toward open position but wherein such discharge pressure on the pilot valves is overcome by pressure of a control fluid until such time that there is an excessive rise in the discharge pressure, the large capacity valve being spring pressed to its open position whenever there is no control pressure acting thereon.

Other objects of the invention will be apparent from the following detailed description, the claims, and the drawing in which:

The single figure of the drawing is a schematic cross section view of the main valve and the two pilot valves, the same being shown as a part of a hydrant refueling system for aircraft.

The pressure regulating main valve is generally referred to by the numeral 5. It has a housing 6 having at its inlet end a flange 7 for attachment to a source of fluid under pressure. Its other end is adapted to be attached to a coupler 8 by releasable means not shown. Coupler 8 may be generally similar to the type shown in FIG. 2 of Davies Patent 2,630,822. The upper end of the coupler is connected to a main delivery conduit 9 and the coupler has a coupler valve 10, that may be actuated to open and closed positions by a handle 11. When actuated to an open position, coupler valve 10 moves poppet valve 12 downwardly to open outlet port 13 of housing 6. When coupler valve 10 is closed, as shown, poppet 12 is held against seat 14 by spring 15.

Housing 6 has a plurality of radial ribs 16 which support a generally cup shaped member 17 that is spaced from the outer wall of housing 6 so as to provide a fluid passage 18 leading from the inlet port 21 to outlet port 13. Member 17 guidingly supports stem 20 of poppet valve 12. Member 17 also guidingly supports a main valve element 24 sealed thereagainst by packing 26 and constantly urged by spring 27 toward a closed position against seat 22 that surrounds inlet port 21 and sealing against packing 25, mounted on main valve element 24.

A large capacity pilot valve generally designated 30 has a housing portion 31 that defines cylinders 32 and 33 that are separated by a transverse wall 34. A piston 35 is mounted within cylinder 32 and sealed by packing ring 36. A valve head 37 is within cylinder 33 and sealed by packing 38. Valve head 37 is connected to piston 35 by a stem 40 that passes through transverse wall 34 and sealed with respect thereto by packing 42. Stem 40 may have an unsealed threaded or other form of separable connection with valve head 37.

Housing 31 has a large capacity fluid passage 44 that communicates with a chamber 19 formed within cup shaped member 17 and with a relatively large port 45 that leads to a large capacity chamber 46 and that is surrounded by a valve seat 47. The upper end of valve head 37 carries a packing ring 48 engageable with seat 47 for closing port 45. Valve head 37 has a passage 49 therethrough to permit fluid within chamber 46 to have access to the under side of valve head 37 whereby fluid pressures on opposite ends of valve head 37 are substantially balanced when valve head 37 is in open position. Packing 48 is substantially the same diameter as packing 38 and when valve head 37 is in closed position against seat 47 valve head 37 is substantially balanced with respect to fluid within chamber 46. When in closed position, valve head 37 is also substantially balanced with respect to fluid pressure within port 45 because the area of the upper face of valve head 37, exposed to fluid within port 45 when valve head 37 is against seat 47, is substantially the same as the area of the lower end of valve head 37. Spring 51 bears against piston 35 for constantly urging valve head 37 toward its open position in which piston 35 butts against a projection 52. Large capacity passage 50 connects chamber 46 with main valve inlet port 21.

A small capacity pilot valve is designated by the numeral 55 and has a housing 56 defining a cylinder 57 separated by a wall 58 from a chamber 59. At the bottom of the chamber 59 there is a valve seat 60 surrounding small capacity vent passage 61.

Within cylinder 57 is a piston 62 urged downwardly by spring 63 and sealed by packing 64. The piston has a stem 65 extending through opening 66 in wall 58 and sealed by packing 67. The lower end of stem 65 constitutes a valve element 68 cooperable with seat 60 for opening and closing communication between chamber 59 and passage 61. Vent passage 70 connects chamber 59 to passage 18 in main valve housing 6 and a small capacity vent conduit 71 connects vent passage 61 with large capacity passage 44, flow therebetween being controlled by a throttling valve 72, the latter preferably being in the form of an adjustable needle valve. Small capacity conduit 74 connects conduit 71 to chamber 46, there being a restricted orifice 75 between conduits 71 and 74.

Pilot valves 30 and 55 are manually controllable from a remote location. To accomplish this there is a compressor or other source 76 of air under pressure connected by a line 77 to an adjustable pressure reducing valve 78 having a gauge 79 and which in turn is connected by a conduit 80 to a dead man control valve 81. The latter has a housing 82 containing a spool valve 83 urged upwardly by spring 84 and movable downwardly by manual operator 85. A conduit 86 connects the interior of housing 82 to the lower end of cylinder 32 and via conduit 87 also connects with the lower end of cylinder 57.

Conduit 9 connects with a coupler 90 that is similar to coupler 8 and which is attachable to fuel tank 91 in wing 92 of an airplane. Coupler 90 has a handle 93 for opening and closing a valve therein.

Incorporated within conduit 9 is a venturi 94. A sensing line 95 connects the inlet end 96 of the venturi to the upper ends of cylinders 57 and 32 via manually operable adjustable needle valve 97 and pressure sensing lines 101 and 102. Another sensing line 98 leads from the throat 99 of the venturi to the downstream side of needle valve 97 in line 95, and there being a needle valve 100 in line 98. Needle valves 97 and 98 may be manipulated for obtaining the desired pressure in line 101 for a given pressure within conduit 9.

Operation

The figure illustrates the position of the parts when main valve inlet 21 is connected to a source of fuel under pressure and the refueling operation is to be started. At this time, fuel under pressure in inlet port 21 has passed through passage 50, port 45 and passage 44 to chamber 19 to assist spring 27 in maintaining main valve element 24 in closed position. This is accomplished by the fact that the transverse area of the upper side of valve member 24 as defined by packing 26 is greater than the area on the lower side defined by sealing member 25 and exposed to pressure fluid within inlet port 21. Also at this time the under sides of pistons 62 and 35 are vented to atmosphere via conduits 86, 87 and vent opening 88 of dead man valve 81, consequently valve element 68 is closed by action of spring 63 and valve element 37 is open by action of spring 51.

To start the fueling operation, handles 11 and 93 are manually operated to open valves 10, 12 and the valve (not shown) within coupler 90. The operator then manually depresses operator 85 of the dead man valve 81. Downward movement of operator 85 disconnects conduit 86 from vent opening 88 and connects it to air pressure conduit 80 so that air under pressure is admitted to the under side of piston 62 to move the latter upwardly to open valve element 68 and to the under side of piston 35 to move valve element 37 upwardly to its closed position against seat 47. Closing of valve element 37 cuts off the supply of pressure fluid from passage 50 through passage 44 to the upper side of main valve element 24 and opening of valve element 68 permits the fluid in chamber 19 to drop in pressure by venting it through passage 44, throttling valve 72, conduit 71, passage 61, chamber 59 and passage 70 to passage 18 in housing 6 downstream of main valve element 24. To permit such venting flow, conduit 71, passage 61 and conduit 70 are of greater flow capacity than restricted orifice 75. Because of the lowering of pressure in chamber 19, as just described, main valve element 24 will be opened by the pressure of fluid within inlet port 21 and fuel will flow through passage 18 and outlet port 13 through conduit 9, venturi 94 and coupler 90 into tank 91.

Fluid passing through venturi 94 will generate fluid pressure within lines 95 and 98, which pressure may be adjusted by valves 97 and 100 so that a selected pressure will be generated in line 101 for a given pressure of fluid within conduit 9. When the pressure within conduit 9 reaches a predetermined value, the related pressure developed within line 101 will force piston 62 downwardly until pilot valve 68 reaches a throttling position such that pressure will build up on the upper side of main valve element 24 to cause the latter to maintain a throttling position causing a flow rate through passages 18 and conduit 9 whereby the pressure in conduit 9 will be maintained at the desired value, as for example, 35 p.s.i. In the event the pressure in conduit 9 tends to either drop below or exceed this value, there will be a corresponding change in pressure in line 101 and pilot valve 68 will be caused to open or close a greater amount and result in further opening or closing of main valve element 24 until the pressure in conduit 9 again reaches the desired pressure.

In the event the pressure in conduit 9 is increased beyond the desired pressure and such increased pressure is maintained, pilot valve 68 will close and cause main valve 24 to close for cutting off further supply of fuel to the tank. However, under certain conditions closing of pilot valve 68 and the introduction of fuel to chamber 19 through passage 50, chamber 46, small capacity conduit 74, orifice 75 and passage 44 may not be rapid enough to close main valve element 24 before the pressure in conduit 9 builds up so as to exceed the desired pressure by an undesirable amount. For example, if the desired pressure is 35 p.s.i. the main valve may not close until the pressure has reached or even exceeds pumping pressure. To avoid this, the large capacity pilot valve 30 and its spring 51 are so designed that it will open when the fuel in conduit 9 reaches a pressure only slightly greater than the desired pressure, as for example 40 p.s.i. when the desired pressure is 35 p.s.i. Opening of pilot valve 30 and the large capacity port 45 permits fuel from passage 50 to quickly enter chamber 19 to cause rapid closing of main valve element 24 and consequently prevent further rise of pressure in conduit 9. Because pilot valve 30 operates independently of pilot valve 55, the former may be designed or set to open at any predetermined higher pressure within conduit 9 relative to the desired pressure of initiating closing of pilot valve 55.

An advantage for having pilot valve 30 urged toward open position by spring 51, rather than toward closed position, occurs in the event there is a sudden loss of pressure in conduit 9 and sensing lines 101 and 102, as may be the case if conduit 9 should break or become disconnected at the tank or venturi. In such case, as soon as the operator becomes aware of the break or disconnection he will release operator 85 of the dead man valve which will cut off supply of air pressure from conduit 80 to conduit 86 and vent the latter to atmosphere through opening 88. This immediately drops the air pressure underneath pistons 62 and 35 of the pilot valves. Spring 63 will then close pilot valve 55 and spring 51 will open pilot valve 30 and fuel from inlet port 21 will rapidly pass through passage 50, port 45 and passage 44 to chamber 19 to quickly close main valve element 24. At this time some fuel will also pass from chamber 46 through conduit 74 and orifice 75 to passage 44 into chamber 19 to also contribute to the closing of main valve element 24.

In prior valve systems in which pilot valve 30 is urged toward closed position by a spring, it is required that there be fuel pressure in sensing line 102 for opening the pilot valve even though dead man valve 81 is operated for venting air pressure from the under side of piston 35. With no pressure in line 102 because of the break or disconnection of conduit 9 in such prior systems, it is obvious that the large capacity pilot valve would not open and therefore closing of the main valve element 24 to cut off loss of fuel through broken or disconnected conduit 9 would be accomplished at a relatively slow rate through closing of pilot valve 55 by its spring 63.

Although only a preferred embodiment of the invention has been specifically illustrated and described herein, it is understood that minor variations may be made therein without departing from the spirit and scope of the invention, as defined by the claims.

I claim:

1. A valve assembly comprising a main valve having an inlet, an outlet, and a main valve element for controlling flow of liquid therebetween, said main valve having a chamber to which the main valve element is exposed, passage means having a small capacity portion and a large capacity portion for delivering fluid from the inlet to the chamber to urge the main valve element toward its closed position, a vent passage connected to said small capacity portion for venting fluid from said chamber, a small capacity pilot valve for opening and closing said vent passage, a large capacity pilot valve for opening and closing said large capacity portion and having a spring urging the same toward open position, and means for applying fluid pressure to said small capacity pilot valve for urging the same toward open position and to said large capacity pilot valve for urging the same toward closed position.

2. The valve assembly of claim 1 in which there is a means for directing fluid from said outlet to said small capacity pilot valve for urging the same toward closed position and to said large capacity pilot valve for urging the same toward open position.

3. The valve assembly of claim 1 in which the fluid supplied by the last mentioned means is supplied from a source of fluid under pressure other than the source of the fluid supplied to said inlet.

4. The valve assembly of claim 1 in which said small capacity portion connects to said large capacity portion at locations on either side of said large capacity pilot valve and includes a restricted portion of smaller flow capacity than said vent passage whereby fluid may be vented from said chamber at a faster rate than it may pass through said restricted portion when said small capacity pilot valve is open.

5. The valve of claim 1 in which said large capacity pilot valve includes a valve head having opposed ends of substantially equal areas exposed to fluid in said large capacity portion when said large capacity pilot valve is closed whereby the fluid pressures then acting on said ends are substantially balanced.

6. The valve of claim 5 in which one of said ends is constantly exposed to fluid in said large capacity portion and the other of said ends is isolated from said large capacity portion except via a passage through said valve head.

7. The valve of claim 5 in which said large capacity pilot valve has a cylindrical chamber slidably receiving said valve head, one of said areas being exposed to said cylindrical chamber, and means for directing fluid in said large capacity portion downstream of said valve head to said cylindrical chamber when said large capacity pilot valve is open.

8. The valve of claim 7 in which said valve head has a cylindrical outer surface sealed relative to said cylindrical chamber.

9. A valve assembly comprising a main valve having an inlet, an outlet, and a main valve element for controlling flow of fluid therebetween, said main valve having a chamber to which the main valve element is exposed, passage means for delivering fluid from the inlet to the chamber to urge the main valve element toward its closed position, a vent passage for venting fluid from said chamber, a small capacity pilot valve for opening and closing said vent passage, a large capacity pilot valve for opening and closing said passage means, said large capacity pilot valve including a housing having first and second chambers, said large capacity pilot valve also including a large capacity pilot valve element having a valve head in the first chamber and a piston in the second chamber, a spring bearing on said large capacity pilot valve element urging the same toward open position, manually controlled means for directing fluid under pressure to one end of said piston for urging the large capacity pilot valve element toward closed position and for directing fluid under pressure to said small capacity pilot valve to urge the same toward open position, and conduit means for directing fluid from said outlet port to another end of said piston for urging the large capacity pilot valve element toward its open position and for directing fluid from the outlet port to the small capacity pilot valve to urge the same toward closed position.

10. The valve assembly of claim 9 in which said spring exerts a force upon the large capacity pilot valve element such that the latter will open after the small capacity pilot valve has closed.

11. The valve assembly of claim 10 in which there is a spring urging the small capacity pilot valve toward closed position.

12. The valve assembly of claim 9 in which said housing has a wall separating the first and second chambers and there is a stem passing through the wall and connecting said valve head and piston.

13. The valve assembly of claim 12 in which there is a packing means sealing the first and second chambers relative to each other.

14. The valve assembly of claim 9 in which said valve head is slidably received within said first chamber and sealed relative thereto, said head having one end acted upon by fluid in said large capacity portion when the large capacity pilot valve element is in open position for urging the latter toward its open position, said valve head having another end acted upon by fluid in the first chamber for urging the large capacity pilot valve element toward closed position, means for directing fluid from said passage means to said first chamber, said ends having the same area whereby the fluid pressures acting thereon are balanced.

15. The valve assembly of claim 14 in which said one end has a seating portion for engaging a seat surrounding a portion of said large capacity portion for closing the same, said seating portion when in engagement with said seat defining an area on said one end exposed to pressure of fluid downstream of said seat that is substantially the same as the area of said other end.

16. The valve assembly of claim 14 in which the means for directing fluid to said first chamber comprises a passage in said valve head between said ends.

References Cited by the Examiner
UNITED STATES PATENTS
3,221,764   12/1965   Elbogen et al. _____ 137—489 X M. CARY NELSON, *Primary Examiner.*
R. J. MILLER, *Examiner.*